United States Patent
Nishino et al.

(10) Patent No.: US 10,956,505 B2
(45) Date of Patent: Mar. 23, 2021

(54) DATA SEARCH METHOD, DATA SEARCH APPARATUS, AND NON-TRANSITORY COMPUTER-READABLE STORAGE MEDIUM STORING PROGRAM FOR DATA SEARCH

(71) Applicant: FUJITSU LIMITED, Kawasaki (JP)

(72) Inventors: Fumihito Nishino, Koto (JP); Hiroaki Morikawa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 113 days.

(21) Appl. No.: 16/447,916

(22) Filed: Jun. 20, 2019

(65) Prior Publication Data

US 2019/0303409 A1    Oct. 3, 2019

Related U.S. Application Data

(63) Continuation of application No. PCT/JP2018/001281, filed on Jan. 17, 2018.

(30) Foreign Application Priority Data

Jan. 31, 2017    (JP) .............................. JP2017-015567

(51) Int. Cl.
*G06F 16/903*    (2019.01)
*G06F 16/9032*    (2019.01)
(Continued)

(52) U.S. Cl.
CPC ...... *G06F 16/90335* (2019.01); *G06F 3/0481* (2013.01); *G06F 3/14* (2013.01);
(Continued)

(58) Field of Classification Search
None
See application file for complete search history.

(56) References Cited

U.S. PATENT DOCUMENTS

| | | | |
|---|---|---|---|
| 9,020,972 B1 | 4/2015 | Gaun et al. | |
| 2005/0021877 A1* | 1/2005 | Varpela | G16B 50/00 710/1 |

(Continued)

FOREIGN PATENT DOCUMENTS

| | | |
|---|---|---|
| JP | 2000-003366 | 1/2000 |
| JP | 2005-513621 | 5/2005 |

(Continued)

OTHER PUBLICATIONS

International Search Report, mailed in connection with PCT/JP2018/00128 dated Apr. 17, 2018 (10 pages), with partial English translation.

*Primary Examiner* — Uyen T Le

(74) *Attorney, Agent, or Firm* — Fujitsu Patent Center

(57) ABSTRACT

A method for a data search includes: executing a first process of obtaining a query template used for generating a query, the query template including an output definition statement and a search condition statement, the output definition statement indicating one or more data items as search targets, and the search condition statement indicating a relationship between an identifier to be designated by a search request and the one or more data items, the relationship including a parameter to be replaced by the designated identifier when the query is generated using the query template; executing a second process when the search request includes identifiers, the second process including generating a query based on first query templates each of which is the query template obtained by the first process based on each of the identifiers; and executing a third process that includes obtaining a search result searched based on the generated query.

12 Claims, 12 Drawing Sheets

(51) Int. Cl.
*G06F 16/9038* (2019.01)
*G06F 16/901* (2019.01)
*G06F 12/00* (2006.01)
*G06F 3/0481* (2013.01)
*G06F 3/14* (2006.01)
*G06F 16/00* (2019.01)

(52) U.S. Cl.
CPC .............. *G06F 12/00* (2013.01); *G06F 16/00* (2019.01); *G06F 16/9024* (2019.01); *G06F 16/9032* (2019.01); *G06F 16/9038* (2019.01)

(56) References Cited

U.S. PATENT DOCUMENTS

| | | |
|---|---|---|
| 2006/0070004 A1 | 3/2006 | Miller et al. |
| 2006/0256130 A1 | 11/2006 | Gonzalez |
| 2009/0225365 A1* | 9/2009 | Hayakawa .............. G06K 17/00 358/1.15 |
| 2009/0300102 A1 | 12/2009 | Suzumura et al. |
| 2010/0241629 A1 | 9/2010 | Tatemura et al. |
| 2012/0290620 A1 | 11/2012 | Guan et al. |

FOREIGN PATENT DOCUMENTS

| | | |
|---|---|---|
| JP | 2006-107429 | 4/2006 |
| JP | 2009-289153 | 12/2009 |
| JP | 2014-241042 | 12/2014 |
| WO | 2003/052626 | 6/2003 |
| WO | 2016/170613 | 10/2016 |

* cited by examiner

FIG. 6

RDF DATA

```
<rdf:RDF xmlns···>

<rdf:Description rdf:about="ns2:JP2006-XXXX01">
        <ex:applicant-name rdf:resource="ns1:companyA"/>
        <ex:application-year rdf:datatype="···#integer"> 2006 </ex:application-year>
        <ex:ficlass> G06N3/00 560A </ex:ficlass>
    </rdf:Description>

<rdf:Description rdf:about="ns2:JP2007-XXXX03">
        <ex:applicant-name rdf:resource="ns1:companyA"/>
        <ex:application-year rdf:datatype="···#integer"> 2007 </ex:application-year>
        <ex:ficlass> G06N3/00 560A </ex:ficlass>
    </rdf:Description>

...

</rdf:RDF>
```

QUERY TEMPLATE                                    133

```
SELECT ?year (count(?id) as ?value)  WHERE {
    ?id   ex:applicant-name     %URI%;
          ex:application-year   ?year;
          ex:ficlass            "G06N3/00 560A".
} GROUP BY ?year  ORDER BY ?year
```

FIG. 8

QUERY
　　　　　　　　　　　　　　　　　　　　　　　　　┌─ 134

SELECT ?year (count(?id) as ?value) WHERE {
　　?id　　ex:applicant-name　　<ns1:companyA>;
　　　　　　ex:application-year　　?year;
　　　　　　ex:ficlass　　　　　　"G06N3/00 560A".
} GROUP BY ?year ORDER BY ?year

SEARCH
RESULT　　　　　┌─ 135

| year | value |
|------|-------|
| 2006 | 10 |
| 2007 | 13 |
| 2008 | 20 |

FIG. 9

QUERY — 136

```
SELECT ?applicant ?year (count(?id) as ?value)  WHERE {
    VALUES (?applicant) { (<ns1:companyA>) (<ns1:companyB>) (<ns1:companyC>) }
    ?id    ex:applicant-name      ?applicant;
           ex:application-year    ?year;
           ex:ficlass             "G06N3/00 560A".
} GROUP BY ?applicant ?year  ORDER BY ?year
```

SEARCH RESULT — 137

| applicant | year | value |
|---|---|---|
| companyA | 2006 | 10 |
| companyB | 2006 | 12 |
| companyC | 2006 | 13 |
| companyA | 2007 | 13 |
| companyB | 2007 | 7 |
| companyC | 2007 | 20 |
| companyA | 2008 | 20 |
| companyB | 2008 | 21 |
| companyC | 2008 | 5 |

FIG. 10
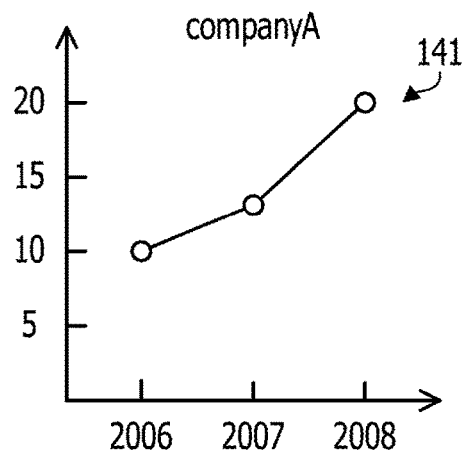
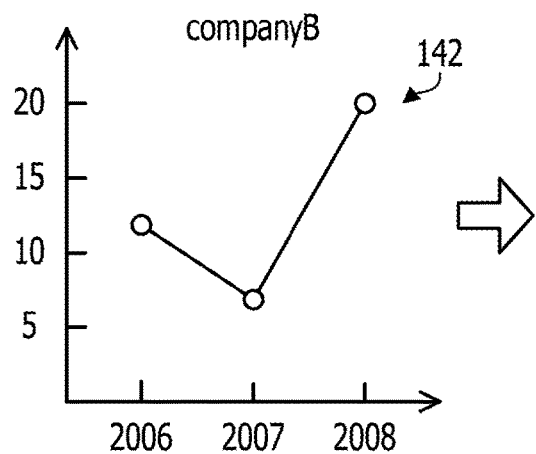
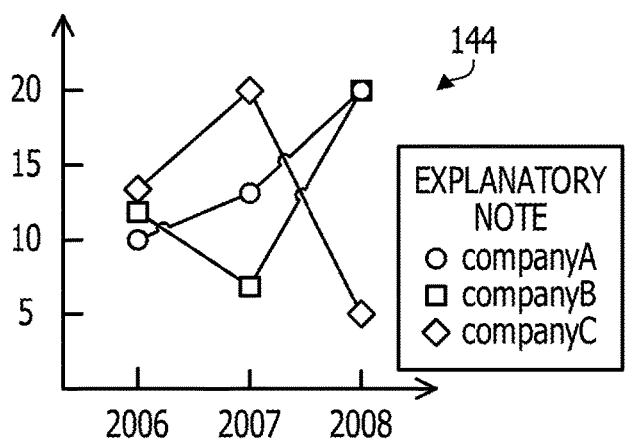
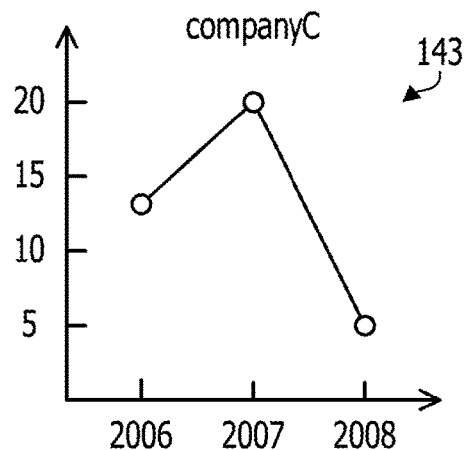

DATA SEARCH METHOD, DATA SEARCH APPARATUS, AND NON-TRANSITORY COMPUTER-READABLE STORAGE MEDIUM STORING PROGRAM FOR DATA SEARCH

CROSS-REFERENCE TO RELATED APPLICATION

This application is a continuation application of International Application PCT/JP2018/001281 filed on Jan. 17, 2018 and designated the U.S., the entire contents of which are incorporated herein by reference. The International Application PCT/JP2018/001281 is based upon and claims the benefit of priority of the prior Japanese Patent Application No. 2017-015567, filed on Jan. 31, 2017, the entire contents of which are incorporated herein by reference.

FIELD

The embodiments discussed herein are related to a data search method, a data search apparatus, and a non-transitory computer-readable storage medium storing a program for data search.

BACKGROUND

There is a technology called as dynamic publishing, as a technology for dynamically generating a Web page to be browsed by users. The dynamic publishing may be called as various names, such as dynamic semantic packaging, dynamic delivery systems, and data-driven content services. In the dynamic publishing, rather than storing a final display screen as a static file, by preparing a template and applying specific data designated to the template, it is possible to dynamically generate display screens such as maps embedded with graphs and pins, and lists embedded with data. For this purpose, a mechanism that extracts associated data from a database according to a user's request and visualizes the extracted data, is constructed.

At least a part of a program of realizing the dynamic publishing may be executed on a client on which a Web page is displayed. For example, the client downloads a program file (script file or the like) from a Web server. The program file includes a search module for searching for data corresponding to a user's input from a data file, a visualization module for generating visualized content by processing searched data, or the like. The client calls a program module according to the user's input, processes by searching demanded data, and dynamically generates visualization content by using the data. The generated visualization content is rendered and displayed as a Web page.

A publishing system that provides multimedia functionality to wireless terminals is proposed. The proposed publishing system, a server dynamically generates application data based on scene description data and transmits the generated application data to the wireless terminal. The application data includes content data, layout data, and control logic data. The wireless terminal responds to an event and controls the display by using the received application data.

In addition, an integrated navigation system that dynamically generates navigation links based on a hierarchical structure of web sites, is proposed. In addition, a web application server is proposed to reduce the processing cost of memory copy. The proposed web application server detects an instruction to embed data of another file when executing a script program. When the command is detected, the Web application server records identification information of another file without reading the data of another file at a stage thereof. The Web application server transmits another file, to the client, indicated by the identification information together with the HTML (HyperText Markup Language) file generated by the script program.

In addition, a virtual database system which provides a client with the function of a virtual database in which a plurality of databases are virtually integrated, is proposed. The proposed virtual database system stores a schema of the virtual database recognized by the client, the schemas of the plurality of databases, and mapping rules for converting both. The virtual database system converts a virtual query received from the client into a query for the plurality of databases based on the mapping rule, and transmits the converted query to the plurality of databases.

Examples of the related art include International Publication Pamphlet No. WO 2003/052626, Japanese Laid-open Patent Publication No. 2006-107429, Japanese Laid-open Patent Publication No. 2009-289153, and Japanese Laid-open Patent Publication No. 2014-241042.

SUMMARY

According to an aspect of the embodiments, a method for a data search performed by a computer, the method includes: executing a first process that includes obtaining a query template used for generating a query, the query template including an output definition statement and a search condition statement, the output definition statement indicating one or more data items which are search targets, the search condition statement indicating a relationship between an identifier to be designated by a search request and the one or more data items, the relationship including a parameter to be replaced by the designated identifier when the query is generated based on the query template; executing a second process when the search request includes a plurality of identifiers, the second process being configured to generate the query based on first query templates, each of the first query templates being the query template obtained by the first process in accordance with each of the plurality of identifiers included in the search request, the second process including replacing the parameter included in the relationship in the search condition statement for a first variable, the first variable being a string variable indicating that a value range is a set of the plurality of identifiers, and the value range being a range of possible values as the parameter, and adding a second data item which is a search target to the output definition statement, the second data item including a data item corresponding to each of the plurality of identifiers included in the search request; and executing a third process that includes obtaining a search result searched based on the generated query, the search result including first data corresponding to the one or more data items and second data corresponding to the second data item, and converting the search result into visual information to be displayed.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 is a diagram illustrating a description example of the RDF data,

FIG. 7 is a diagram illustrating an example of a query template;

FIG. 8 is a diagram illustrating an example of a first query and a first search result;

FIG. 9 is a diagram illustrating an example of a second query and a second search result;

FIG. 10 is a diagram illustrating a display example of a graph in which search results are visualized;

DESCRIPTION OF EMBODIMENTS

In dynamic publishing, a user designates an identifier for one data element (sometimes referred to as entity). Then, a search module searches data associated with the one identifier, and a visualization module generates visualized content corresponding to the one identifier. For example, it is assumed that a relationship between a city, a year, and the population is described in a data file. In this case, when a user specifies the identifier of "Tokyo", the population of each year in Tokyo is searched and a graph indicating population change in Tokyo is generated. In addition, when a user specifies the identifier of "Osaka", the population of each year in Osaka is searched and a graph indicating the population change in Osaka is generated.

Here, the user may want to compare visually data associated with a plurality of identifiers. At this time, rather than arranging and displaying the plurality of visualized contents corresponding to the plurality of identifiers, it may be preferable to display a single visualized content in which a plurality of visualized contents are integrated. For example, rather than displaying three graphs of a graph indicating the population change in Tokyo, a graph indicating the population change in Osaka, and a graph indicating the population change in Nagoya side by side, it may be preferable to display a single graph that indicates the population change of the three cities Tokyo, Osaka, and Nagoya.

However, various variations may be considered for the combination of identifiers designated by the user and the number of identifiers. Therefore, when the user designates the plurality of identifiers, how can the user efficiently realize a mechanism for generating a single visualized content is a key point.

As one method, a method is considered in which a plurality of search results are obtained by calling the search module for each identifier designated by the user corresponding to the plurality of identifiers and data to be input the visualization module is generated by integrating the plurality of search results. However, in this method, a load of data extraction may be increased due to the increase in the number of calls of the search module and post-integration of the search results, and a delay time may be increased.

In one aspect, the embodiment is to provide a display program, a display method, and a display device that effectively process a visualization process of data associated with the plurality of identifiers.

First Embodiment

Hereinafter, the present embodiment will be described with reference to the drawings. A first embodiment will be described.

Figure 1:
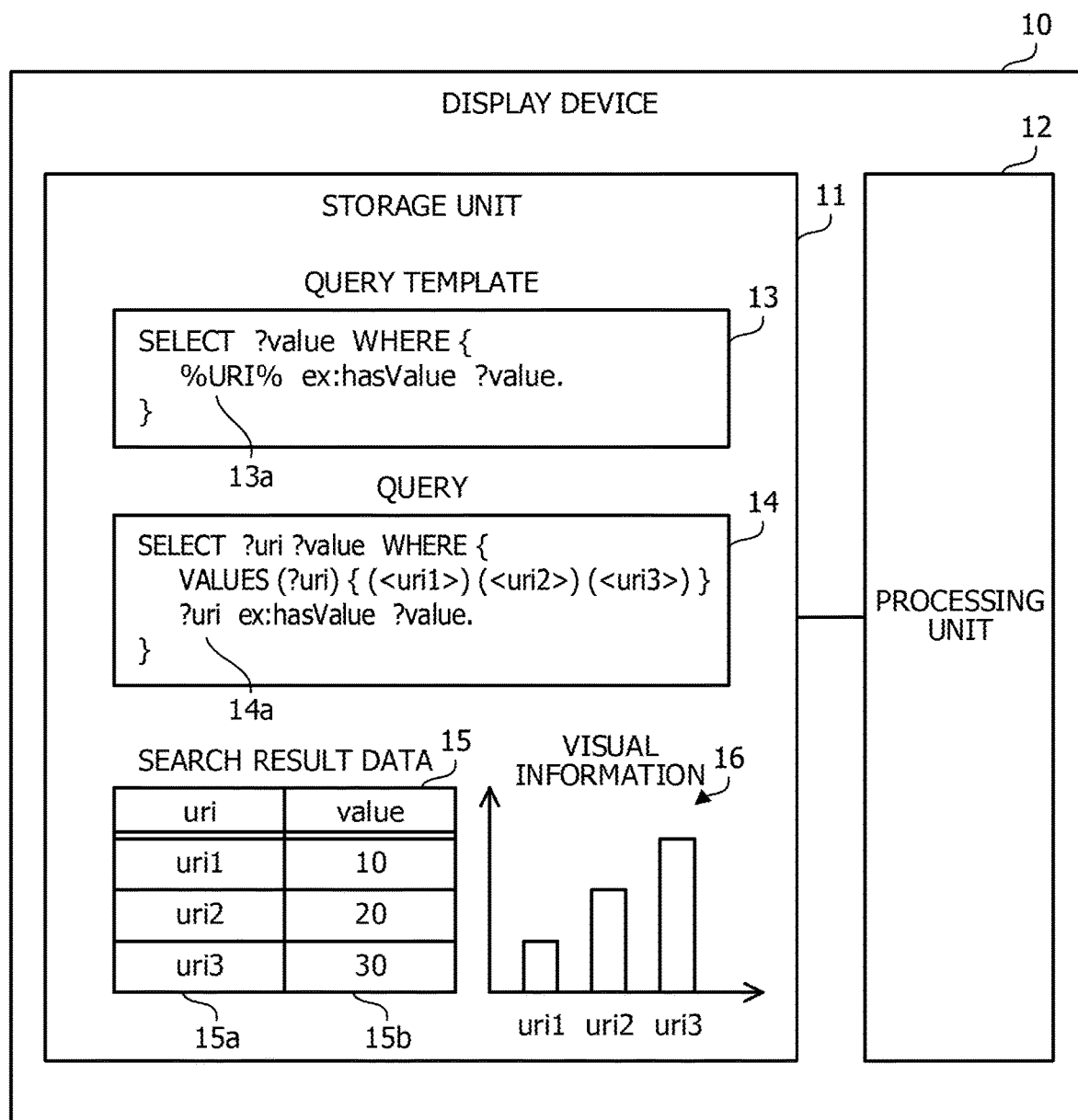
FIG. 1 is a diagram illustrating an example of a display device of a first embodiment.

FIG. 1 is a diagram illustrating an example of a display device of the first embodiment. A display device 10 of the first embodiment dynamically generates and displays graphical data such as graphs and maps as a visualization result from non-graphical data such as text data. The display device 10 may be a terminal device operated by a user, or may be a server device that generates the graphical data in response to a request from the terminal device and transmits the data to the terminal device.

The display device 10 includes a memory unit 11 and a processing unit 12. The memory unit 11 is a volatile memory device such as a RAM (Random Access Memory), or a non-volatile memory device such as an HDD (Hard Disk Drive) and a flash memory. For example, the processing unit 12 is a processor such as a CPU (Central Processing Unit) and a DSP (Digital Signal Processor). However, the processing unit 12 may include an electronic circuit for a specific purpose such as an ASIC (Application Specific Integrated Circuit) and an FPGA (Field Programmable Gate Array). The processor executes a program stored in a memory such as the RAM. For example, the processor executes the display program. A set of multiple processors may be referred to as a "multiprocessor" or simply a "processor."

The memory unit 11 stores a query template 13. The query template 13 is a template for generating a query (search request sentence) for searching for data used for visualization from a database. The query template 13 is created on the assumption that one identifier is focused and data associated with the one identifier is searched.

The query template 13 includes an output definition statement and a search condition statement. The output definition statement defines one or more data items to be output. In an example of FIG. 1, a data item 15b is defined by using a variable "?value". In the search condition statement (may be referred to as "a query pattern statement"), a relationship between the designated identifier and the data item 15b defined in the output definition statement, is described by the parameter 13a (argument) indicating one designated identifier. It also may be said that the search condition statement indicates a condition (e.g., a query pattern) of data corresponding to the data item 15b. The parameter 13a is described as a predetermined string such as "% URI %" at a position where the designated identifier is to be embedded. In the example of FIG. 1, data having a relationship of "ex:hasValue" with the designated identifier is extracted from the database as a value of the variable "?value".

The processing unit 12 receives one or more identifiers. The received identifier is to identify a data unit in the database, and, for example, is a URI (Uniform Resource Identifier) or an IRI (Internationalized Resource Identifier). For example, the identifier is designated from the user. The receiving of one or more identifiers corresponds to the receiving of a request for visualizing and searching the data associated with the one or more identifiers from the database.

When only one identifier is received, the processing unit 12 may generate a query in which the parameter 13*a* of the query template 13 is replaced for the one identifier. By this, the search condition becomes "<uri> ex:hasValue ?value". The processing unit 12 may obtain search result data relating to one designated identifier based on this query. For example, data of the database is described according to RDF (Resource Description Framework). For example, the query is described by SPARQL (SPARQL Protocol and RDF Query Language). The processing unit 12 may convert and display the search result data relating to one identifier to visual information such as graphs relating to the one identifier. Meanwhile, when the plurality of identifiers are received, even if the processing unit 12 uses the query template 13 as it is, the processing unit 12 may not search data associated with the plurality of identifiers at one time. Therefore, the processing unit 12 generates the query 14 as follows.

The processing unit 12 generates the query 14 based on the query template 13 and the plurality of designated identifiers. At this time, the processing unit 12 defines a variable 14*a* in the search condition statement of the query 14 in which a range of a possible value is a set of the plurality of identifiers. In the example of FIG. 1, a new variable "?uri" obtained by one of three identifiers of "<uri1>", "<uri2>", and "<uri3>" is defined. The name of the variable 14*a* may be a name not used in the query template 13. In addition, the processing unit 12 replaces the parameter 13*a* in the search condition statement for the variable 14*a*. For example, when the three identifiers are designated, the processing unit 12 defines a variable "?uri" in which three possible values are present such as "VALUES (?uri){(% URI1%) (% URI2%)(% URI3%)}". In addition, the processing unit 12 changes the search condition to "?uri ex:hasValue ?value" by using the variable. The processing unit 12 may generate the query 14 by replacing "% URI1%", "% URI2%", and "% URI3%" for a specific identifier.

In addition, the processing unit 12 adds a variable to the output definition statement to determine whether data to be output is data relating to one identifier among the plurality of identifiers and to include the data item 15*a* according to a value of the variable 14*a* in the search result. A value output as the data item 15*a* may be an identifier itself or a value having a predetermined relationship with the identifier. That is, the variable added to the output definition statement may be the variable "?uri" indicating designated identifier, or may be another variable dependent on "?uri".

The processing unit 12 obtains search result data 15 based on the query 14. The search result data 15 includes a plurality of records matching with the search condition indicated by the query 14, and each record includes data items 15*a* and 15*b*. The search result data 15 logically has a table structure. The processing unit 12 extracts, for example, records matching with the query 14 from the database. The database may be included in the display device 10 or may be present outside the display device 10.

The search result data 15 corresponds to an integration of the plurality of search result data obtained when data associated with the plurality of identifiers are separately searched. For example, the search result data 15 includes three records of (uri1, 10), (uri2, 20), and (uri3, 30). "10" of the first record is data searched by substituting "<uri1>" for the parameter 13*a* of the query template 13. "20" of the second record is data searched by substituting "<uri2>" for the parameter 13*a* of the query template 13. "30" of the third record is data searched by substituting "<uri3>" for the parameter 13*a* of the query template 13.

The processing unit 12 converts the search result data 15 into visual information 16 and displays the converted result. The visual information 16 is the visualized content including graphical elements such as graphs and maps. For example, the visual information 16 includes a plurality of graphical elements corresponding to the plurality of identifiers, such as a plurality of broken lines and a plurality of bars corresponding to a plurality of identifiers. The visual information 16 corresponds to information obtained by superimposing a plurality of visualization results obtained when the data associated with the plurality of identifiers are separately visualized. Since the search result data 15 includes data relating to a plurality of identifiers in a distinguishable form, the processing unit 12 may search a single graph, a single map or the like obtained by superimposing the visualization results of the plurality of identifiers, from the search result data 15.

According to the display device 10 of the first embodiment, when the plurality of identifiers are designated, the parameter 13*a* is replaced for the variable 14*a* by being defined the variable 14*a* of which a range of the possible values is a set of the identifiers, and the data item 15*a* according to the value of the variable 14*a* is added to the output definition statement. The search result data 15 searched based on the query 14 generated in this manner is obtained, the search result data 15 is converted into visual information 16, and the converted result is displayed.

As a result, a single visualization result such as a single graph (may be referred to as "an overlay chart") and a single map is displayed. In the single visualization result, it is easy to perform the comparison of data among the plurality of identifiers, in contrast to a case where a plurality of visualization results such as the plurality of graphs and a plurality of maps are simply arranged and displayed. In addition, the query 14 corresponding to the plurality of identifiers is generated from the query template 13 for a single identifier. As a result, by performing the query 14 once, all data used for visualization may be extracted from the database, the query may be not performed for each identifier, and the number of searches may be reduced. In addition, the search result may be not integrated subsequently. Therefore, it is possible to reduce a load of search.

Second Embodiment

Figure 2:
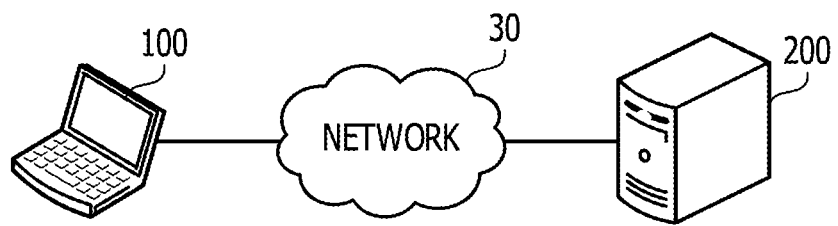
FIG. 2 is a diagram illustrating an example of an information processing system of a second embodiment.

Next, a second embodiment will be described. FIG. 2 is a diagram illustrating an example of an information processing system of the second embodiment.

The information processing system of the second embodiment is a system for providing a dynamic publishing service, and dynamically generates and displays a Web page including the visualized content. The information processing system includes a client device 100 and a server device 200. The client device 100 and the server device 200 are connected to a network 30. For example, the network 30 is a wide area network such as the Internet.

The client device 100 is a client computer used by the user. The client device 100 performs Web browser in which the Web page is displayed in response to a user's input. The client device 100 is accessed to the server device 200 via the network 30, and downloads various files from the server device 200. In the downloaded file, a script file in which a program is described and the data file in which data is described, are included. The client device 100 may process data by executing a script program, and generate dynamically the Web page.

The server device 200 is a server computer functioning as a Web server. The server device 200 stores various files such as the script file and the data file in the non-volatile memory device. The server device 200 transmits a requested file to the client device 100 according to access from the client device 100. However, the server device 200 may generate dynamically a file to be transmitted to the client device 100 by executing the server program according to the access.

Here, in the dynamic publishing of the second embodiment, the client device 100 may dynamically generate, as the visualized content, graphical data including the graphical elements such as graphs, maps, and lists from non-graphical data such as text data. The generation of the graphical data is implemented by a script program. The client device 100 may generate a raster image (bitmap image) which is a set of pixels as the graphical data, or may generate a vector image which is a set of lines defined by a mathematical expression or the like. The client device 100 searches for data used for visualization from the downloaded data files, converts the searched data into the visualized content, and displays the converted result.

In the second embodiment, although the client device 100 generates the visualized content, the server device 200 may generate dynamically the visualized content by executing the server program and may also provide the generated result to the client device 100. Hereinafter, the client device 100 will be mainly described on an assumption that a graph generates a graph from the text data by executing the script program by the client device 100.

Figure 3:
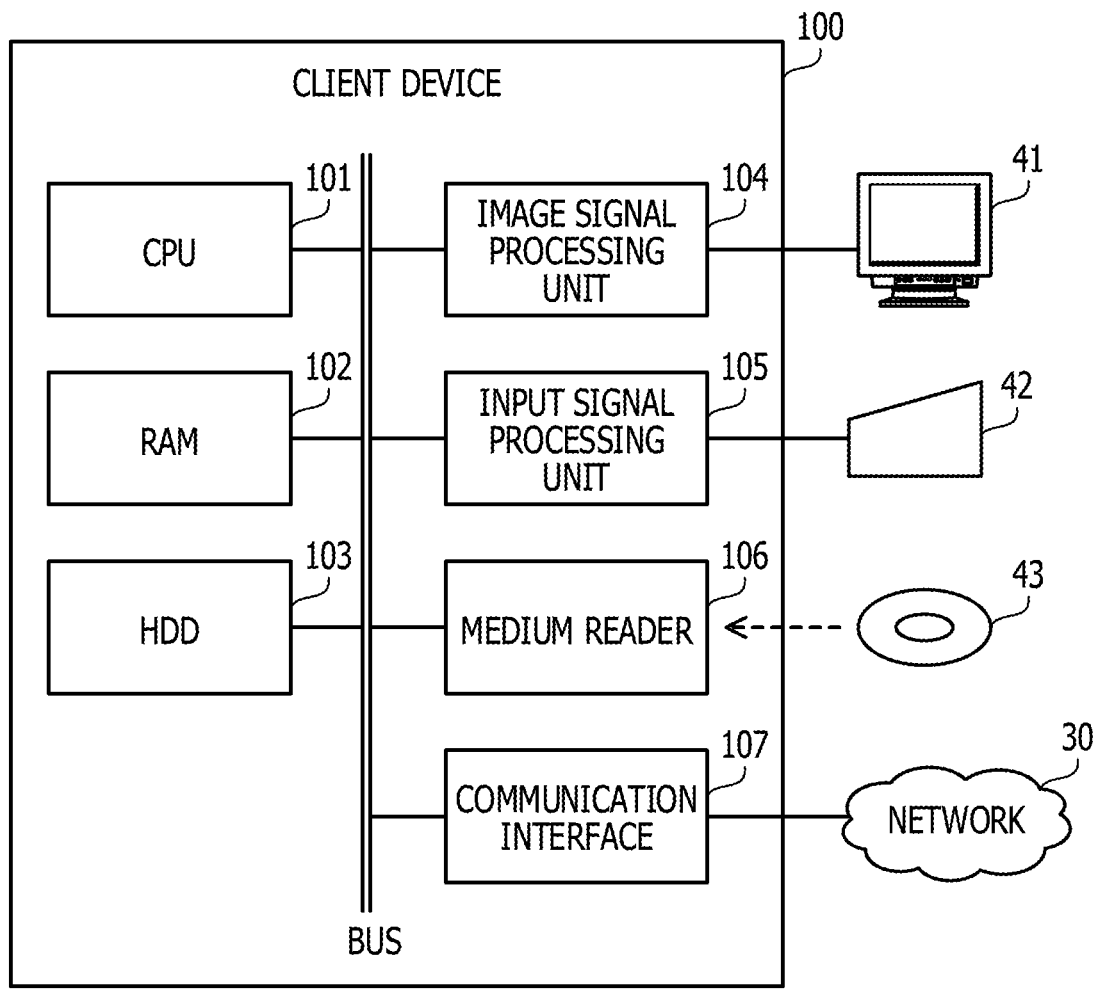
FIG. 3 is a block diagram illustrating a hardware example of a client device.

FIG. 3 is a block diagram illustrating a hardware example of the client device. The client device 100 includes a CPU 101, a RAM 102, an HDD 103, an image signal processing unit 104, an input signal processing unit 105, a medium reader 106, and a communication interface 107. The units are connected to a bus. The server device 200 may also be mounted by the same hardware as that of the client device 100.

The CPU 101 is a processor including an arithmetic circuit that performs a command of a program. The CPU 101 loads at least a part of the program and the data stored in the HDD 103 to the RAM 102, and executes the program. The CPU 101 may include a plurality of processor cores, the client device 100 may include a plurality of processors, and the following process may be performed in parallel by using the plurality of processors or processor cores. In addition, a set of the plurality of processors may be referred to as a "multiprocessor" or simply a "processor".

The RAM 102 is a volatile semiconductor memory that temporarily stores programs executed by the CPU 101 and data used by the CPU 101 for computations. The client device 100 may include a memory of a type other than the RAM, and may include a plurality of memories.

The HDD 103 is the non-volatile memory device that stores programs of software such as OS (Operating System), application software, and data. The client device 100 may include other types of the memory devices such as a flash memory and an SSD (Solid State Drive), and may include a plurality of non-volatile memory devices.

The image signal processing unit 104 outputs an image on a display 41 connected to the client device 100 according to a command from the CPU 101. As the display 41, any type of displays such as a CRT (Cathode Ray Tube) display, a liquid crystal display (LCD: Liquid Crystal Display), a plasma display, and an organic EL (OEL: Organic Electro-Luminescence) display, may be used.

The input signal processing unit 105 obtains input signals from an input device 42 connected to the client device 100, and outputs the obtained input signals to the CPU 101. As the input device 42, it is possible to use a mouse, a touch panel, a pointing device such as a touch pad or a trackball, a keyboard, a remote controller, a button switch, or the like. In addition, multiple types of input devices may be connected to the client device 100.

The medium reader 106 is a reader that reads programs and data recorded on a recording medium 43. As the recording medium 43, for example, it is possible to use a magnetic disk, an optical disc, a magneto-optical disc (MO: Magneto-Optical disc), a semiconductor memory, or the like. The magnetic disk includes a flexible disk (FD: Flexible Disk) and an HDD. The optical disc includes a CD (Compact Disc) and a DVD (Digital Versatile Disc).

For example, the medium reader 106 copies programs and data obtained from the recording medium 43 to another recording medium such as the RAM 102 and the HDD 103. For example, the read program is executed by the CPU 101. The recording medium 43 may be a portable recording medium, and may be used for distributing programs and data. In addition, the recording medium 43 and the HDD 103 may be referred to as a computer readable recording medium.

The communication interface 107 is connected to the network 30, and is an interface that performs communication with another node via the network 30. For example, the communication interface 107 is a wired communication interface connected to a communication device such as a switch by a cable. The communication interface 107 may be a wireless communication interface connected to a base station by wireless link.

Figure 4:
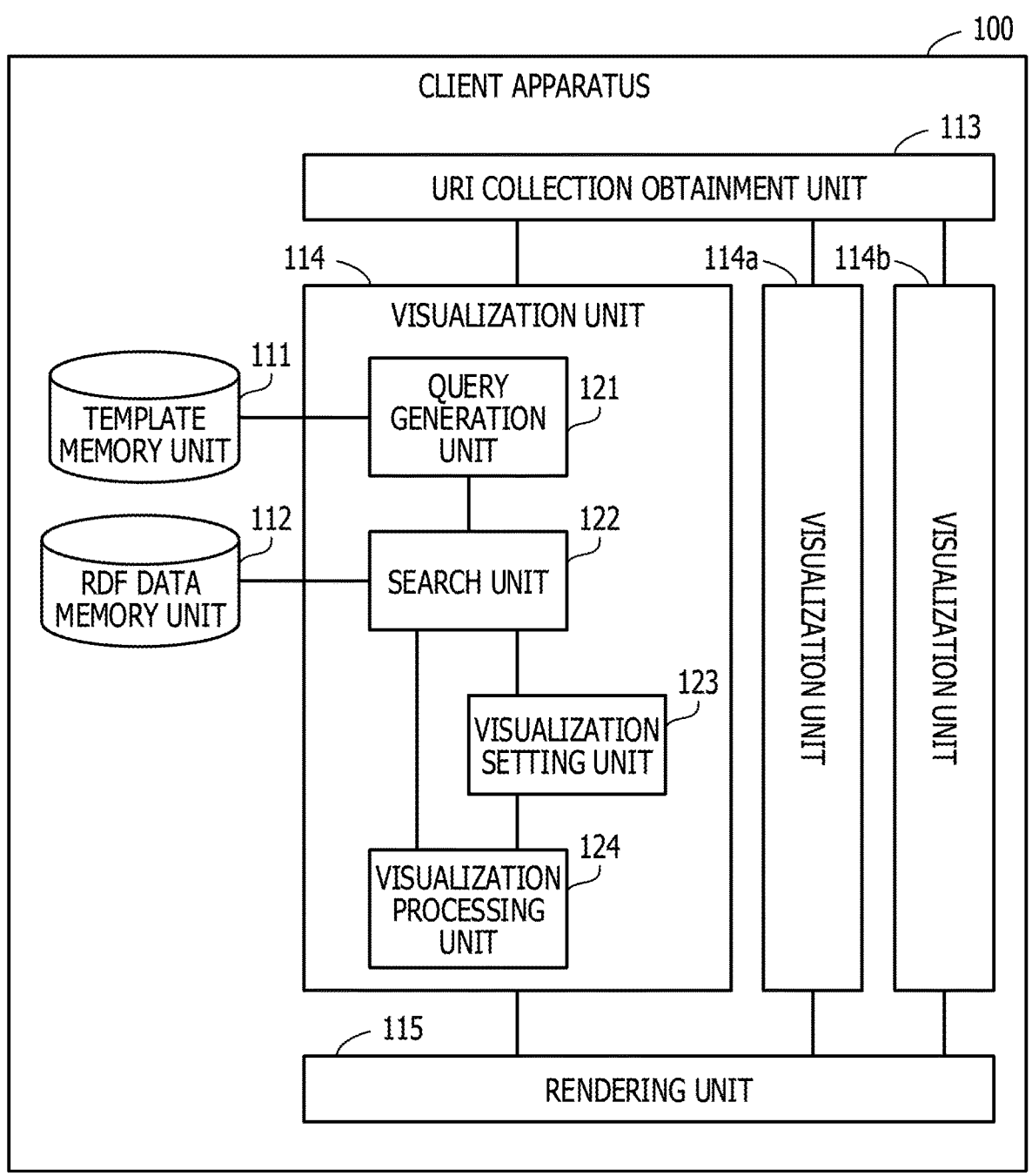
FIG. 4 is a block diagram illustrating a function example of the client device.

FIG. 4 is a block diagram illustrating a functional example of the client device. The client device 100 includes a template memory unit 111, an RDF data memory unit 112, a URI collection obtainment unit 113, visualization units 114, 114a, and 114b, and a rendering unit 115. For example, the template memory unit 111 and the RDF data memory unit 112 are mounted by using a memory area of the RAM 102 or the HDD 103. For example, the URI collection obtainment unit 113, the visualization units 114, 114a, and 114b, and the rendering unit 115 are mounted by using programs executed by the CPU 101.

The template memory unit 111 stores the query template which is the query issued when data satisfying a predetermined condition is searched in the data file. The query template stored in the template memory unit 111 is used by the visualization units 114, 114a, and 114b. In the second embodiment, the SPARQL is assumed as a query language used in the query template. The query template stored in the template memory unit 111 is downloaded from the server device 200.

The RDF data memory unit 112 stores the data file in which Linked Data is described. The Linked Data may be a structured data (i.e., data having a structure) in which data units referred to as the entities are linked to each other and relationships between the entities are described. One entity corresponds to one entity (such as thing, concept, or anything of interest) such as "city", "company", and "patent application", and an identifier such as URI and IRI is given. In the following description, the identifier of the entity may be referred to as the URI. The data file stored in the RDF data memory unit 112 is used by the visualization units 114, 114a, and 114b. In the second embodiment, the RDF is assumed as a description method of the Linked Data. The RDF will be described below. The data file stored in the RDF data memory unit 112 is downloaded from the server device 200.

The URI collection obtainment unit 113 obtains the URI corresponding to one or more entity to be visualized. The URI collection obtainment unit 113 may obtain a single URI indicating a single entity, and may obtain a plurality of URIs indicating a set (collection entity sequence) of a plurality of entities at the same time. The obtainment of the plurality of URIs indicates integration and visualization of data relating to the plurality of entities.

For example, when the population change of "Tokyo" is wanted to visualize, the URI of "Tokyo" is obtained. In addition, when the integration of the population changes of "Tokyo", "Osaka", and "Nagoya" is wanted to visualize, the URI of "Tokyo", the URI of "Osaka", and the URI of "Nagoya" are obtained. The URI collection obtainment unit 113 may obtain the URI designated directly from users. In addition, the URI collection obtainment unit 113 may obtain the URI designated indirectly from users by searching the entity satisfying a condition designated from users. For example, when the user designates a condition that "a city with a population of 10 million or more", the URI collection obtainment unit 113 searches the data file for a city that satisfies the designated condition, and obtains the URI of the searched city from the data file.

When the URI is selected, the URI collection obtainment unit 113 selects the visualization unit corresponding to a type (for example, URI indicating city, URI indicating company, or the like) of the obtained URI from a plurality of visualization units such as the visualization units 114, 114a, and 114b. The URI collection obtainment unit 113 stores information indicating a corresponding relationship with the visualization unit that selects the type of the URI. Each visualization unit is mounted by the script program. When there is no script program to be used in the client device 100, the URI collection obtainment unit 113 downloads the script program from the server device 200. The URI collection obtainment unit 113 calls the selected visualization unit.

The visualization units 114, 114a, and 114b obtain one or more URI from the URI collection obtainment unit 113, and generate the visualized content. The visualization unit 114 includes a query generation unit 121, a search unit 122, a visualization setting unit 123, and a visualization processing unit 124. Another visualization unit also includes the same module as that of the visualization unit 114.

The query generation unit 121 reads the query template associated with the visualization unit 114 from the template memory unit 111. When a desired query template does not present in the template memory unit 111, the query generation unit 121 downloads the query template from the server device 200. The query generation unit 121 generates the query based on the URI obtained from the URI collection obtainment unit 113 and the query template. The generated query is to extract, from the data file, related data satisfying a predetermined relationship with the entity based on the entity indicated by the obtained URI.

Here, the query generation unit 121 generates the query by another method according to whether the single URI or the plurality of URIs are obtained from the URI collection obtainment unit 113. The query template stored in the template memory unit 111 defines a method of searching associated data based on the single entity. When the single URI is obtained, the query generation unit 121 generates the query by inputting the URI at a specific position in the query template. Meanwhile, when the plurality of URIs are obtained, the query generation unit 121 generates a single query for searching the associated data based on each of the plurality of entities by editing the query template instead of the generation of the plurality of queries corresponding to the plurality of URIs. The search result obtained by performing the query corresponds to one obtained by combining the plurality of search results obtained by performing individually the plurality of queries corresponding to the plurality of URIs.

The search unit 122 reads the data file from the RDF data memory unit 112, and performs the query generated by the query generation unit 121. When a desired data file is not present in the RDF data memory unit 112, the search unit 122 downloads the data file from the server device 200. The search unit 122 interprets the query obtained from the query generation unit 121, and extracts data corresponding to the search condition indicated by the query from the data file. The data described in the data file logically has a graph structure (network structure), but the search result generated by the search unit 122 logically has a table structure (relational structure).

When the query performed by the search unit 122 is the query obtained by specifying the plurality of URIs, that is, when the search result includes the associated data of the plurality of entities, the visualization setting unit 123 notifies the visualization processing unit 124 of change of setting (configuration). The configuration may include information on a classification method of the plurality of records included in the search result such as the specification of a data item indicating an entity serving as a base point among a plurality of data items (columns) included in the search result. In addition, the configuration may include information on a display form of the visualized content such as a flag indicating whether or not to display an explanatory note of graph. An initial value of the setting of the visualization processing unit 124 is given to be suitable when the search result includes only associated data of the single entity. Therefore, when the plurality of URIs are not obtained, the configuration may not be changed.

The visualization processing unit 124 obtains the search result from the search unit 122, and generates the visualized content including the graphical elements such as graphs, maps, and lists from the obtained search result. As a graph which may be generated, a line graph (line chart), a bar graph (bar chart), a bubble chart, a radar chart, and the like may be mentioned. For example, the visualization processing unit 124 generates the bar graph in which the horizontal axis indicates the year and the vertical axis indicates population, from the search results of a table type including the year and the population as the data item. The type of visualized content generated by the visualization processing unit 124 may depend on the type of URI handled by the visualization unit 114, and may be different from the type of visualization content generated by another visualization units such as the visualization units 114a and 114b.

The visualization processing unit 124 is generally mounted to correspond to both the visualization of the search result obtained by the single entity as a base point and the visualization of the search result obtained by the plurality of entities as the base point. The visualization processing unit 124 may generate the visualized content such as graphs and maps for the single entity according to default settings. In addition, the visualization processing unit 124 may generate integrated visualization content obtained by superimposing graphs and maps relating to the plurality of entities in accordance with a setting notified from the visualization setting unit 123. The integrated visualization content includes the line graph including a plurality of broken lines corresponding to the plurality of entities, the bar graph in which a plurality of bars corresponding to the plurality of entities are arranged horizontally or stacked vertically, or the like. In addition, the integrated visualization content includes a map in which a plurality of positions corresponding to the plurality of entities are mapped or the like.

The rendering unit 115 obtains the visualized content from any of the visualization units. The obtained visualized content may include graphical information and image information. The rendering unit 115 generates a Web page in which the visualized content is displayed by using the obtained visualized content and an HTML template, and causes the display 41 to display the generated Web page.

Figure 5:
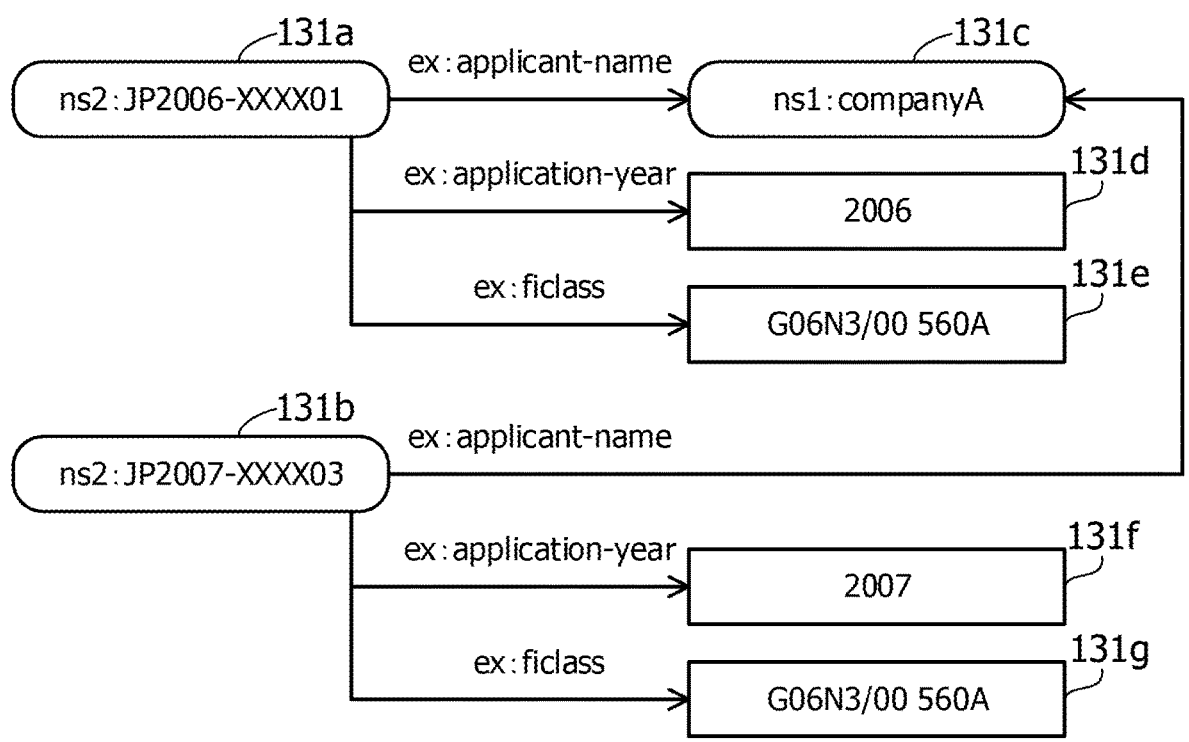
FIG. 5 is a diagram illustrating an example indicating RDF data.

Next, RDF data and the query will be described. FIG. 5 is a diagram illustrating a graph example indicating the RDF data. The RDF data is a collection of statements. One statement represents one fact as three sets (triple) of subject, predicate, and object. In other word, The one statement may represent one fact as a set of three entities (triple) in the form of subject-predicate-object expressions. For example, a fact that "the population of Tokyo is 13 million" is represented by the triples of which the subject is "Tokyo", the predicate is "population" and the object is "13 million". The RDF data may be represented as a directed graph including a node corresponding to the subject or the object and an edge corresponding to the predicate.

As an example, the RDF data is considered in which the bibliographical matters of the patent application are described. A graph indicating the RDF data includes nodes 131a to 131g. Each of the nodes 131a and 131b corresponds to an entity indicating a certain patent application. The entity of node 131a is identified by the URI "ns2:JP2006-XXXX01" ("ns2" is separately defined namespace). The entity of the node 131b is identified by the URI "ns2:JP2007-XXXX03". The node 131c corresponds to an entity indicating a certain company. The entity of the node 131c is identified by the URI "ns1:companyA" ("ns1" is separately defined namespace). The entity of the node 131b is identified by the URI "ns2:JP2007-XXXX03". The node 131c corresponds to an entity indicating a certain company. The entity of the node 131c is identified by the URI "ns1:companyA" ("ns1" is separately defined namespace).

Each of the nodes 131d to 131g indicates a fixed value (literal) such as numerical values and character strings. The node 131d indicates "2006". The nodes 131e and 131g indicate "G06N3/00 560A". The node 131f indicates "2007". The node 131d indicates "2006". The nodes 131e and 131g indicate "G06N3/00 560A". The node 131f indicates "2007".

The node 131a and the node 131c are coupled by the predicate "ex:applicant-name" ("ex" is separately defined namespace). This represents a fact that "the applicant of JP2006-XXXX01 is companyA". The node 131a and the node 131d are coupled by the predicate "ex:application-year". This represents a fact that "the application year of JP2006-XXXX01 is 2006". The node 131a and the node 131e are coupled by the predicate "ex:ficlass". This represents a fact that "the technical classification of JP2006-XXXX01 is G06N3/00 560A".

Similarly, the node 131b and the node 131c are coupled by the predicate "ex:applicant-name". This represents a fact that "the applicant of JP2007-XXXX03 is companyA". The node 131b and the node 131f are coupled by the predicate "ex:application-year". This represents a fact that "the application year of JP2007-XXXX03 is 2007". The node 131b and the node 131g are coupled by the predicate "ex:ficlass". This represents a fact that "the technical classification of JP2007-XXXX03 is G06N3/00 560A".

As described above, in the RDF data, the identifier such as the URI is assigned to each entity. One entity may be the subject of a plurality of statements. In addition, one entity may be the object of the plurality of statements.

FIG. 6 is a diagram illustrating a description example of the RDF data. RDF data 132 is obtained by describing the graph of FIG. 5 as the text data by using an XML (Extensible Markup Language). The RDF data 132 is stored in the RDF data memory unit 112. In the RDF data 132, a tag "rdf:Description" corresponds to one subject. Each of the tags "ex:applicant-name", "ex:application-year", and "ex:ficlass" immediately below the tag corresponding to the subject corresponds to the predicate. An attribute "rdf:resource" included in the tag "ex:applicant-name" corresponds to the object. In addition, the numerical value immediately below the tag "ex:application-year" corresponds to the object. In addition, the character string immediately below the tag "ex:ficlass" corresponds to the object. The RDF data 132 describes the bibliography of each of a plurality of patent applications by such a hierarchical tag structure.

FIG. 7 is a diagram illustrating an example of the query template. The query template 133 is a template used to generate a query (search request sentence) for searching data from the RDF data 132. The query template 133 is stored in the template memory unit 111. The query template 133 is created on an assumption that the URI of one entity is accepted as a parameter and the associated data is searched by the one entity as the base point. Here, it is assumed that the URI of an entity indicating one enterprise is accepted as a parameter and data relating to patent applications of the company is searched. In the query template 133, the parameter is described as "% URI %". By replacing this character string for one URI, it is possible to generate a query for searching data associated with the one URI.

The query template 133 includes a condition section in which a search condition is indicated, a grouping section in which a grouping method of data matching with the search condition is indicated, and an output section in which an output format of the search result is indicated. In the query template 133, three variables are used in addition to parameters. "?year" is a variable indicating year. "?id" is a variable indicating patent application. "?value" is a variable indicating the number of patent applications. In the condition section, a search condition is illustrated in which the applicant of "?id" is "% URI %", the application year of "?id" is "?year", and the technical classification of "?id" is "G06N3/00 560A". In the search condition, an applicant and a technology classification are given and the patent application and the application year are indefinite. A set of the patent application and the application year matching the search condition is extracted from the RDF data 132.

In addition, in the grouping section, "?year" as a variable used for grouping is designated. That is, in the grouping section, the set of the patent application and the application year matching with the search condition is grouped by the application year, is indicated. Also, in the output section, "?year" and "?value" as the data item (column) included by each record of the search result, are designated. A value of "?value" is a value obtained by counting the number of patent applications counted for each application year. As a result, a table typed search result having the application year and the number of patent applications in the data item, is generated. That is, the query template 133 indicates that the number of patent applications for each year in which the applicant is "% URI %" and the technology classification is "G06N3/00 560A", is searched.

FIG. 8 is a diagram illustrating an example of a first query and a first search result. A query 134 is generated by replacing "% URI %" which is a parameter section of the query template 133 for "<ns1:companyA>" which is the URI indicating one company. The query 134 indicates that the number of patent applications for each year of which the technology classification is "G06N3/00 560A" and the applicant is "companyA". A search result 135 is generated by executing the query 134. The search result 135 includes "year" indicating the application year and "value" indicating the number of applications as the data item. For example, the search result 135 includes a record in which the number of applications in 2006 is 10, the number of applications in 2007 is 13, and the number of applications in 2008 is 20.

As described above, when the entity as the base point is one, the parameter section of the query template 133 may be replaced for the single URI. Meanwhile, when the entities as the base point are plural, since the query template 133 does not correspond to a search of the plurality of entities as the base point, the query template 133 is converted.

FIG. 9 is a diagram illustrating an example of a second query and a second search result. A query 136 is a query obtained by transforming and generating the query template 133 such that the number of patent applications in a plurality of companies may be searched at one time for each year. In the query 136, the new variable "?applicant" which is not used in the query template 133, is added. "?applicant" is a variable of which a range of possible values (value range) is a set of designated URIs. Here, a value of "?applicant" is selected from three URIs of "<ns1:companyA>", "<ns1:companyB>", and "<ns1:companyC>".

In the condition section, a variable definition statement that defines the new variable is added. In addition, "% URI %" described in the condition section is replaced for "?applicant". Therefore, according to the condition section of the query 136, a set of the applicant, the number of applications, and the application year matching with the search condition, is extracted from the RDF data 132. In addition, in the grouping section, "?applicant" is added as a variable used for grouping. Therefore, according to the grouping section of the query 136, the set of the applicant, the number of applications, and the application year matching with the search condition, is grouped by a set of the applicant and the application year. In addition, in the output section, "?applicant" is added as a data item included in each record of the search result. Therefore, according to the output section of the query 136, a search result including the applicant, the application year, and the number of patent applications as data items, is generated.

That is, the query 136 indicates that the number of applicants and the application year pairs are searched for a patent application whose applicant is any of three entities and whose technical classification is "G06N3/00 560A". A variable indicating a reference entity is added to the grouping unit in order to avoid data relating to different entities from being summed. Here, by adding "?applicant" to the grouping section, the number of applications of the three applicants is not added up. In addition, the variable indicating the entity serving as the reference is added to the output unit in order to distinguish whether which entity relates to each of the plurality of records included in the search result. Here, since the number of applications of three applicants is mixed in one search result, the applicants may be distinguished by adding "?applicant" to the output section.

By executing the query 136, a search result 137 is generated. The search result 137 includes "applicant" indicating the applicant, "year" indicating the application year, and "value" indicating the number of applications as the data items. For example, the search result 137 includes a record in which the number of applications filed in a company A in 2006 is 10, the number of applications filed in a company B in 2006 is 12, and the number of applications filed in a company C in 2006 is 13. In addition, the search result 137 includes a record in which the number of applications in the company A in 2007 is 13, the number of applications in the company B in 2007 is 7, and the number of applications in the company C in 2007 is 20. In addition, the search result 137 includes a record in which the number of applications in the company A in 2008 is 20, the number of applications in the company B in 2008 is 21, and the number of applications in the company C in 2008 is 5. The query 136 indicates the records of the search result 137 are sorted in an ascending order of the application year.

In generating of the query 136, the query generation unit 121 detects the parameter section, a grouping section, and an output section from the query template 133. The query generation unit 121 may parse (parsing) the query template 133 or may search for these three sections by pattern matching. The parameter section is a character string predetermined by a template description language such as "% URI %". The grouping section is usually a sequence of one or more variables following "GROUP BY". The output section is usually a sequence of one or more variables interposed between "SELECT" and "WHERE". However, according to the query template, there is a case where "WHERE" may not be present.

In the query 136, although a variable indicating the designated URI is added to the output unit, another variable having a value associated with the designated URI may be added to the output section. As a result, the readability of the search result 137 may be improved. For example, it is conceivable to define another variable or other literals indicating another entity linked to the entity as the base point and other literals in the condition section, and to add another variable to the output section. It is conceivable to define the variable "?applicant-label" as "?applicant ex:label ?applicant-label" and add the defined result to the output section. As a result, the label (abbreviation or the like) is output in place of the URI of the entity as the base point.

In addition, in the query 136, although the variable itself indicating the designated URI is added to the output section, another variable including a value obtained by processing the designated URI may be added to the output section. For example, it is conceivable to add another variable including a value obtained by combining the designated URI and another string to the output section. It is conceivable to define a variable "?newlabel" as "CONCAT(str(?applicant), str(?year)) AS ?newlabel" and add the defined result to the output section. A value of "?newlabel" is a string in which a URI indicating a company and an application year are concatenated. In addition, another variable including a value obtained by processing a value associated with the designated URI by combining the above, may be defined.

FIG. 10 is a diagram illustrating a display example of a graph in which the search result is visualized. When the query 134 is executed, for example, a graph 141 is generated by the visualization processing unit 124. The graph 141 is a line graph illustrating transition based on a time in the number of patent applications of the "companyA". The horizontal axis of the graph 141 indicates the application year and the vertical axis indicates the number of applications. When a query similar to the query 134 is executed for the "companyB", a graph 142 is generated. In addition, when the query similar to the query 134 is executed for the "companyC", a graph 143 is generated "companyC". Each of graphs 141 to 143 are the visualized content generated from a search result obtained by one entity as the base point.

On the other hand, when the query 136 is executed, for example, a graph 144 is generated by the visualization processing unit 124. The graph 144 is a line graph illustrating transition based on a time in the number of patent applications of three companies of "companyA", "companyB", and "companyC". Similar to the graphs 141 to 143, the horizontal axis of the graph 144 indicates the application year, and the vertical axis indicates the number of applications. The graph 144 corresponds to a graph in which the broken lines of the graphs 141 to 143 are superimposed. An explanatory note is added to the graph 144 to indicate a correspondence relationship between the three broken lines and the three entities. The graph 144 indicates the integrated visualization content generated from the search result obtained by three entities as the base point.

Figure 11:
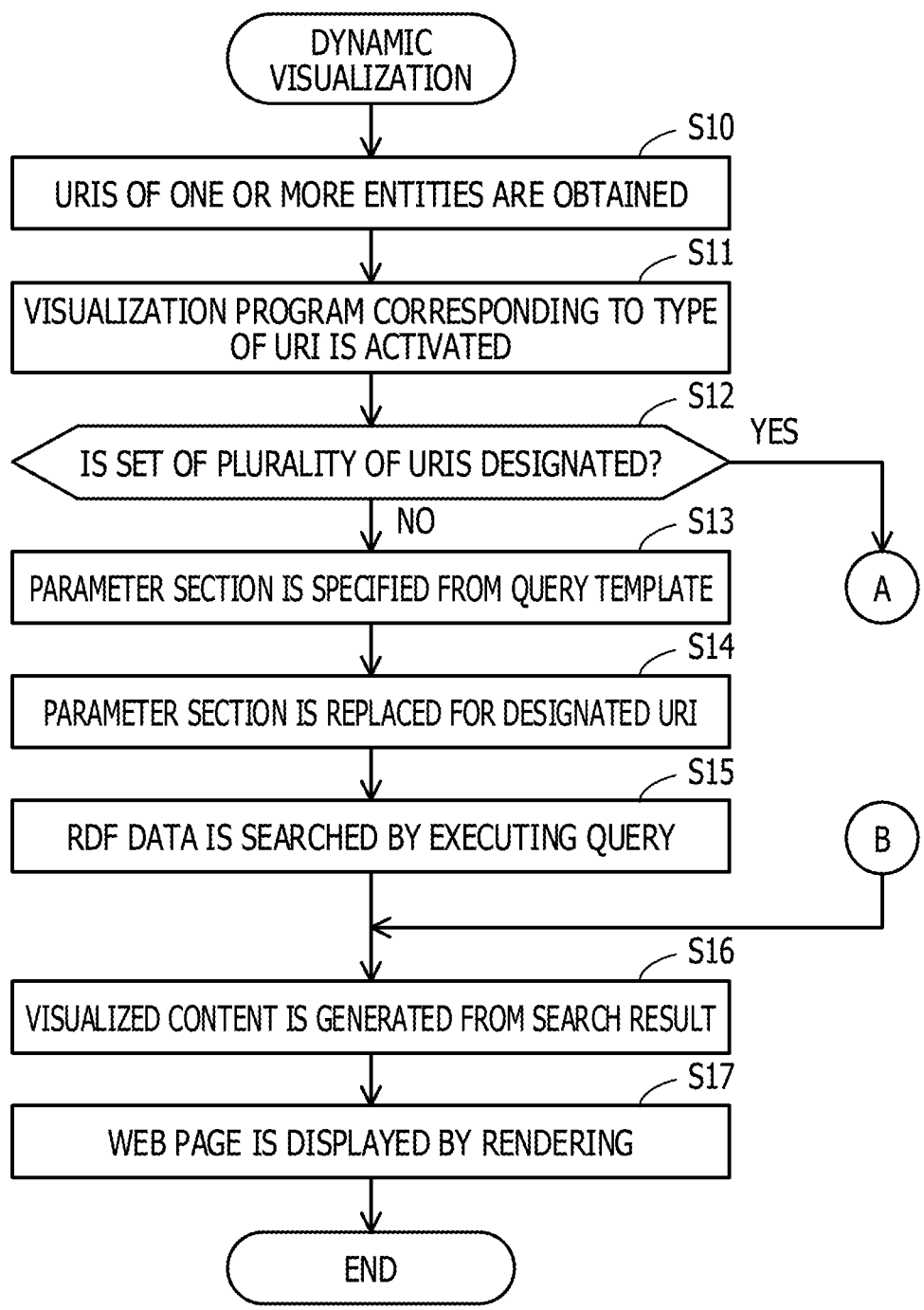
FIG. 11 is a flowchart illustrating a procedure example of dynamic visualization.

Next, a process procedure of the client device 100 will be described. FIG. 11 is a flowchart illustrating a procedure example of dynamic visualization. (S10) The URI collection obtainment unit 113 obtains one or more URIs indicating one or more focused entities. When two or more URIs indicating sets of two or more entities (collection entity sequence) are obtained at the same time, the two or more URIs are usually URIs indicating the same type of entity. For example, URIs indicating two or more cities and URIs indicating two or more companies may be obtained at the same time.

(S11) The URI collection obtainment unit 113 determines the visualization program corresponding to a type of the obtained URI such as a visualization program corresponding to the city and the visualization program corresponding to the company. When the determined visualization program does not present in the client device 100, the URI collection obtainment unit 113 downloads the visualization program from the server device 200. The URI collection obtainment unit 113 activates the determined visualization program. In the following description, it is assumed that the visualization unit 114 is called.

When one URI is obtained, the URI collection obtainment unit 113 may call one visualization unit once. The one URI is delivered to a callee's visualization unit. In addition, even when two or more URIs (two or more URIs of the same type) belonging to one collection entity sequence are obtained, the URI collection obtainment unit 113 may call the one visualization unit once. The two or more URIs are delivered to the callee's visualization unit. On the other hand, when two or more URIs of different types are obtained, the URI collection obtainment unit 113 calls another visualization unit for each type of the URI.

(S12) The query generation unit 121 determines whether the URI designated by the URI collection obtainment unit 113 is a set of the plurality of URIs. In a case of a set of the plurality of URIs, the process proceeds to step S18. In a case of one URI, the process proceeds to step S13.

(S13) The query generation unit 121 reads the query template 133 corresponding to the visualization unit 114 from the template memory unit 111. When the query template 133 does not present in the client device 100, the query generation unit 121 downloads the query template 133 from the server device 200. The query generation unit 121 specifies the parameter section (character string such as "% URI %") from the query template 133.

(S14) The query generation unit 121 generates the query 134 by replacing the parameter section specified in step S13 for designated one URI. (S15) The search unit 122 reads the RDF data 132 corresponding to a type of the designated URI from the RDF data memory unit 112. When the RDF data 132 does not present in the client device 100, the search unit 122 downloads the RDF data 132 from the server device 200. In addition, the search unit 122 obtains the query 134 generated in step S14 from the query generation unit 121. The search unit 122 executes the query 134 for the RDF data 132, and generates the search result 135 relating to one URI.

(S16) The visualization processing unit 124 obtains the search result 135 generated in step S15 from the search unit 122. The visualization processing unit 124 generates the visualized content relating to one URI which is the visualized content of a predetermined type including the graphical elements based on the search result 135. For example, the visualization processing unit 124 generates a bar graph indicating the population change of one city, a line graph indicating a change in the number of patent applications of one company, and the like.

(S17) The rendering unit 115 obtains the visualized content generated in step S16 from the visualization processing unit 124. The rendering unit 115 renders the Web page including the obtained visualized content and causes the display 41 to display the rendered Web page.

Figure 12:
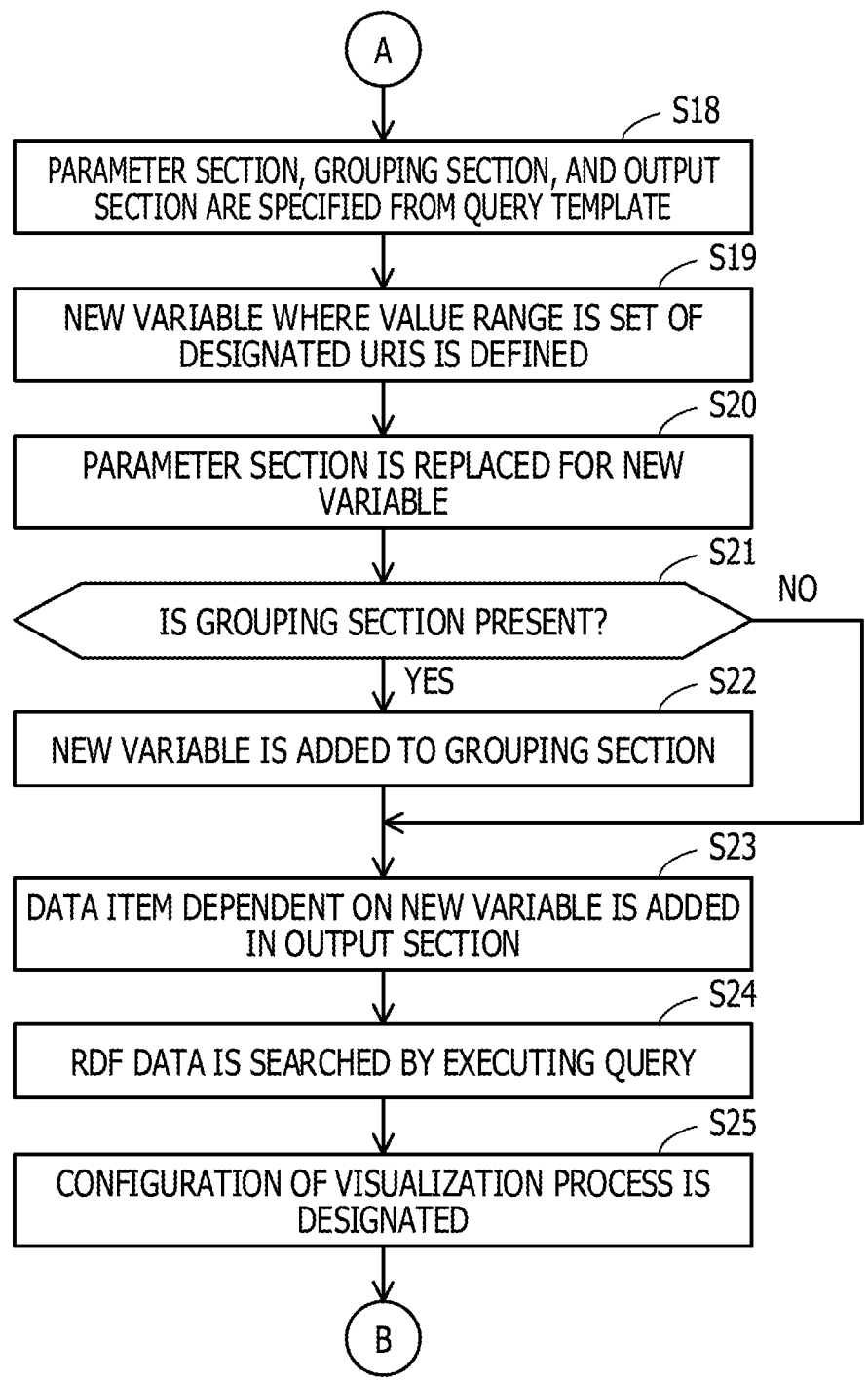
FIG. 12 is a (continued) flowchart illustrating the procedure example of dynamic visualization.

FIG. 12 is a (continued) flowchart illustrating the procedure example of dynamic visualization. (S18) The query generation unit 121 reads the query template 133 corresponding to the visualization unit 114 from the template memory unit 111. The query generation unit 121 specifies the parameter section, the grouping section, and the output section from the query template 133. Depending on the query template, the grouping section may not be present.

(S19) The query generation unit 121, defines a new variable, which is a variable not used in the query template 133, in which a range (value range) of possible values is limited to the plurality of URIs in step S12, and adds a new variable definition statement in the condition section of the query template 133.

(S20) The query generation unit 121 replaces the parameter section designated in step S18 for the new variable defined in step S19. When the plurality of parameter sections are present in the query template 133, each parameter section may be replaced for the new variable.

(S21) The query generation unit 121 determines whether the grouping section is present in the query template 133. When the grouping section is present, the process proceeds to step S22, and when the grouping section is not present, the process proceeds to step S23.

(S22) The query generation unit 121 adds the new variable defined in step S19 in the grouping section designated in step S18. (S23) The query generation unit 121 adds the data item dependent on the new variable defined in step S19, in the output section designated in step S18. For example, the query generation unit 121 adds the new variable in the output section. As a result, the query 136 is generated. Editing on the parameter section, the grouping section, and the output section may be performed in an arbitrary order.

(S24) The search unit 122 reads the RDF data 132 from the RDF data memory unit 112. In addition, the search unit 122 obtains the query 136 generated in step S23 from the query generation unit 121. The search unit 122 executes the query 136 once for the RDF data 132, and generates the search result 137 relating to the plurality of URIs at one time. At this time, the search unit 122 may not execute the plurality of queries and may not combine the plurality of search results.

(S25) The visualization setting unit 123 specifies a configuration for the visualization processing unit 124 so as to be suitable for the visualization of data relating to the plurality of entities. For example, the visualization setting unit 123 specifies a data item ("applicant" or the like) for distinguishing the focused entity of data items included in the search result 137. In addition, for example, the visualization setting unit 123 specifies a configuration, as ON, for displaying an explanatory note indicating the correspondence between the representation method such as a type of line, shape of point, a type of hatching, and a color. Then, the process proceeds to step S16 described above.

According to the information processing system of the second embodiment, in response to an operation of users, it is possible to generate dynamically and display the visualized content including the graphical elements from the text data. When one entity is focused, visualized content is generated by visualizing data relating to the one entity. When the plurality of entities are focused at the same time, the visualized content is generated by visualizing integrally the data relating to the plurality of entities. The integrated visualized content is not content obtained by arranging simply the plurality of visualized contents corresponding to the plurality of entities, but corresponds to a case obtained by superimposing the plurality of visualized contents. Thus, it becomes easy to compare data relating to the plurality of entities.

In addition, when the plurality of entities are focused at the same time, the query template for a single entity is transformed and a query for the plurality of entities is generated. Therefore, it is possible to obtain data relating to the plurality of entities by one search process using one query. Therefore, it is possible to reduce the number of times of query issuance and the number of searches, it is possible to avoid the integration of subsequent search results, and it is possible to reduce the load of a search process.

In addition, the query template may be created for the single entity, and it is not demanded to create another query template for each difference in the number of entities. In addition, it is possible to mount a module that executes queries regardless of the number of focused entities. In addition, the module for generating the visualized content may be mounted to be able to generate both the visualized content for the single entity and the visualized content for the plurality of entities. Therefore, the versatility of query templates and modules is improved, and program implementation is facilitated.

As another method of visualizing data relating to the collection entity sequence, a method may also be considered in which a temporary entity (virtual entity) bundling the plurality of focused entities is registered in RDF data, and the data is searched by the virtual entity as the base point. However, in this case, the virtual entity is added and deleted each time the visualized content is generated, which increases the load. In addition, if there is no authority to rewrite the RDF data, there may be a case where register or deletion of the virtual entities is not performed. On the other hand, according to a method of the second embodiment, rewriting of the RDF data is not demanded and the load is reduced.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A method for a data search performed by a computer, the method comprising:
    executing a first process that includes obtaining a query template used for generating a query, the query template including an output definition statement and a search condition statement, the output definition statement indicating one or more data items which are search targets, the search condition statement indicating a relationship between an identifier to be designated by a search request and the one or more data items, the relationship including a parameter to be replaced by the designated identifier when the query is generated based on the query template;
    executing a second process when the search request includes a plurality of identifiers, the second process being configured to generate the query based on first query templates, each of the first query templates being the query template obtained by the first process in accordance with each of the plurality of identifiers included in the search request, the second process including
        replacing the parameter included in the relationship in the search condition statement for a first variable, the first variable being a string variable indicating that a value range is a set of the plurality of identifiers, and the value range being a range of possible values as the parameter, and
        adding a second data item which is a search target to the output definition statement, the second data item including a data item corresponding to each of the plurality of identifiers included in the search request; and
    executing a third process that includes
        obtaining a search result searched based on the generated query, the search result including first data corresponding to the one or more data items and second data corresponding to the second data item, and
        converting the search result into visual information to be displayed.

2. The method according to claim 1, further comprising:
    executing a fourth process when the number of the identifiers included in the search request is one, the fourth process being configured to generate a query based on the single identifier included in the search request and the query template obtained by the first process,
    wherein the fourth process is configured to replace the parameter included in the relationship in the search condition statement for the single identifier.

3. The method according to claim 1,
    wherein the query template includes a group definition statement indicating that a plurality of data records suitable for the search condition statement is matched with the output definition statement by grouping, and
    wherein the second process is configured to correct the group definition statement to classify the first data corresponding to the one or more data items to a group, by associating with each of the plurality of identifiers included in the set indicated by the first variable.

4. The method according to claim 1,
wherein the visual information converted from search result data is a single graph obtained by superimposing a plurality of graphs corresponding to the plurality of identifiers.

5. An apparatus for a data search, the apparatus comprising:
a memory; and
a processor coupled to the memory, the processor being configured to
execute a first process that includes obtaining a query template used for generating a query, the query template including an output definition statement and a search condition statement, the output definition statement indicating one or more data items which are search targets, the search condition statement indicating a relationship between an identifier to be designated by a search request and the one or more data items, the relationship including a parameter to be replaced by the designated identifier when the query is generated based on the query template,
execute a second process when the search request includes a plurality of identifiers, the second process being configured to generate the query based on first query templates, each of the first query templates being the query template obtained by the first process in accordance with each of the plurality of identifiers included in the search request, the second process including
replacing the parameter included in the relationship in the search condition statement for a first variable, the first variable being a string variable indicating that a value range is a set of the plurality of identifiers, and the value range being a range of possible values as the parameter, and
adding a second data item which is a search target to the output definition statement, the second data item including a data item corresponding to each of the plurality of identifiers included in the search request, and
execute a third process that includes
obtaining a search result searched based on the generated query, the search result including first data corresponding to the one or more data items and second data corresponding to the second data item, and
converting the search result into visual information to be displayed.

6. The apparatus according to claim 5, wherein the processor is further configured to
execute a fourth process when the number of the identifiers included in the search request is one, the fourth process being configured to generate a query based on the single identifier included in the search request and the query template obtained by the first process,
wherein the fourth process is configured to replace the parameter included in the relationship in the search condition statement for the single identifier.

7. The apparatus according to claim 5,
wherein the query template includes a group definition statement indicating that a plurality of data records suitable for the search condition statement is matched with the output definition statement by grouping, and
wherein the second process is configured to correct the group definition statement to classify the first data corresponding to the one or more data items to a group, by associating with each of the plurality of identifiers included in the set indicated by the first variable.

8. The apparatus according to claim 5,
wherein the visual information converted from search result data is a single graph obtained by superimposing a plurality of graphs corresponding to the plurality of identifiers.

9. A non-transitory computer-readable storage medium for storing a program which causes a processor to perform processing for data search, the processing comprising:
executing a first process that includes obtaining a query template used for generating a query, the query template including an output definition statement and a search condition statement, the output definition statement indicating one or more data items which are search targets, the search condition statement indicating a relationship between an identifier to be designated by a search request and the one or more data items, the relationship including a parameter to be replaced by the designated identifier when the query is generated based on the query template;
executing a second process when the search request includes a plurality of identifiers, the second process being configured to generate the query based on first query templates, each of the first query templates being the query template obtained by the first process in accordance with each of the plurality of identifiers included in the search request, the second process including
replacing the parameter included in the relationship in the search condition statement for a first variable, the first variable being a string variable indicating that a value range is a set of the plurality of identifiers, and the value range being a range of possible values as the parameter, and
adding a second data item which is a search target to the output definition statement, the second data item including a data item corresponding to each of the plurality of identifiers included in the search request; and
executing a third process that includes
obtaining a search result searched based on the generated query, the search result including first data corresponding to the one or more data items and second data corresponding to the second data item, and
converting the search result into visual information to be displayed.

10. The non-transitory computer-readable storage medium according to claim 9, the processing further comprising:
executing a fourth process when the number of the identifiers included in the search request is one, the fourth process being configured to generate a query based on the single identifier included in the search request and the query template obtained by the first process,
wherein the fourth process is configured to replace the parameter included in the relationship in the search condition statement for the single identifier.

11. The non-transitory computer-readable storage medium according to claim 9,
wherein the query template includes a group definition statement indicating that a plurality of data records suitable for the search condition statement is matched with the output definition statement by grouping, and wherein the second process is configured to correct the group definition statement to classify the first data corresponding to the one or more data items to a group, by associating with each of the plurality of identifiers included in the set indicated by the first variable.

12. The non-transitory computer-readable storage medium according to claim 9, wherein the visual information converted from search result data is a single graph obtained by superimposing a plurality of graphs corresponding to the plurality of identifiers.

* * * * *